United States Patent
Dijkhuizen et al.

[15] 3,673,159
[45] June 27, 1972

[54] MANUFACTURE OF POLYURETHANES USING ORGANIC ZIRCONIUM COMPOUNDS AS CATALYSTS

[72] Inventors: Willem Dijkhuizen, Zuidlaren, Netherlands; Erich Termin, Niederkassel, Germany; Otto Bleh, Bergheim/Sieg, Germany; Dieter Morgenstern, Rosrath, Germany

[73] Assignee: Dynamit Nobel Aktiengesellschaft, Troisdorf, Germany

[22] Filed: May 11, 1970

[21] Appl. No.: 48,775

[30] Foreign Application Priority Data

May 10, 1969 Germany..................P 19 23 934.0

[52] U.S. Cl................260/77.5 AB, 260/2.5 AB, 260/75 NB
[51] Int. Cl.........................................C08g 22/40
[58] Field of Search..................260/77.5 AB, 75 NB, 2.5 AB

[56] References Cited

UNITED STATES PATENTS 3,136,731  6/1964  Piechota et al.........................260/77.5

OTHER PUBLICATIONS

Britain et al., J. Applied Polymer Sci., 4, No. 11, pp. 207–211, 1960.

*Primary Examiner*—Donald E. Czaja
*Assistant Examiner*—M. J. Welsh
*Attorney*—Burgess, Dinklage & Sprung

[57] ABSTRACT

In the manufacture of a polyurethane by the reaction of a polyol with a polyisocyanate in the presence of a catalyst and in the absence of water, the catalyst used is an organic zirconium compound, preferably a zirconium alcoholate or phenolate, having the formula $(Y)_m Zr(YR)_{4-2m}$ wherein:
  Zr is a zirconium atom
  Y is an oxygen or sulfur atom
  R is an organic radical of up to 12 carbon atoms, which can be alike or different
  m is 0 or 1.

7 Claims, No Drawings

MANUFACTURE OF POLYURETHANES USING ORGANIC ZIRCONIUM COMPOUNDS AS CATALYSTS

PRIOR ART

Polyurethanes are made by the reaction of polyols with polyisocyanates according to the isocyanate polyaddition process. Suitable polyols are: polyethers, polythioethers, polyesters, polyester amides and polyacetals. The polyisocyanates can be any of most of the types known today, preferably di- and triisocyanates. Either the so-called "one-shot" process or the "prepolymer" process can be used for the addition polymerization.

The reaction of the isocyanate groups with the active hydrogen atoms of the polyols is usually accelerated by means of catalysts. It has long been known that tertiary amines have an accelerating action of this kind. In addition to the tertiary amines, organic metal compounds, such as tin(II) octoate and di-n-butyl tin dilaurate, can be used as catalysts. Organic metal compounds which, in an addition to an alcoholic binding of the metal to the organic moieties, also contain a co-ordinative bond are particularly good catalysts. Such chelate compounds are, for example, the acetyl acetonates of zirconium, vanadium and titanium.

All of the catalysts of the prior art, however, have disadvantages. For example, in many catalysts the accelerating action is insufficient. Acetyl acetonates are not soluble or are insufficiently soluble in many reaction systems, so that they have little catalytic effect.

It is also known that, in the manufacture of polyester-polyisocyanate foams, wherein water is used as the foam forming agent and a tertiary amine is used as the accelerator, the pore structure of the foam can be advantageously affected by the addition of zirconium alcoholates derived from long-chained alcohols having at least six carbon atoms.

REFERENCES

1. Saunders-Frisch "Polyurethanes: Chemistry and Technology," Parts I and II, Interscience Publishers, 1962 and 1964.
2. Vieweg-Höchtlen "Kunststoffhandbuch," Vol. VII, Hanser-Verlag 1966.

THIS INVENTION

It has now been found that, in certain reaction mixtures for the synthesis of polyurethanes, which are substantially free of water, and in which most acetyl acetonates do not dissolve, the addition of zirconium or zirconyl alcoholates or phenolates produces a favorable catalytic action on the polymerization reaction.

In addition to this favorable catalytic action, an additional technical advantage has been surprisingly found. If such systems contain traces of water, these traces can very easily be removed by the addition of the zirconium alcoholates. That is, these alcoholates react with water to form the corresponding polymeric esters having about four to six zirconium atoms in the molecule, and also to form, in part, the corresponding alcohols and zirconium hydroxy compounds which in turn are capable of entering into reactions with isocyanate groups. It is recommended that the zirconium alcoholates be added to the component containing traces of water in a preliminary stage, to first dehydrate this component before the isocyanate is added.

The process of this invention for the manufacture of unfoamed polyurethanes comprises the reaction of polyisocyanates with polyols by the addition polymerization process in the presence of a zirconium compound catalyst and/or water-binding agent, which compound has the formula:

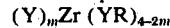

$(Y)_m Zr (YR)_{4-2m}$ wherein Y represents oxygen or sulfur, $m = 1$ or 0, preferably 0, and R has preferably up to 12 carbon atoms and represents in each case an identical moiety or a plurality of different moieties of the group: cycloalkyl, arylalkyl, alkylaryl and aryl, preferably a branched or unbranched alkyl moiety having one to five carbon atoms, and having in some cases an oxygen or sulfur atom between two carbon atoms, these compounds being soluble in the reaction mixture. In some cases, they are prepared by condensation wholly or partially with the intermolecular or intramolecular loss of alcohol or thioalcohol, or phenol or thiophenol, as the case may be. The polyols used in the process are preferably substantially anhydrous.

THE CONVENTIONAL REACTANTS

The polyols used are preferably polyether polyols having a functionality in regard to isocyanate groups of 2 to 9 and hydroxyl numbers of 30 to 600. Such polyether polyols can be prepared by the reaction of polyvalent alcohols with alkylene oxides. Glycerine, trimethylol propane, pentaerythritol, sorbitol, glucose and saccharose can be used, for example, as polyvalent alcohols. Examples of suitable alkylene oxides are propylene oxide, 1,2- 1,3- and 2,3-epoxybutane, styrene oxide and epichlorhydrin. Also mixtures of these substances with up to 30 percent by weight of ethylene oxide are useful. The reaction can be catalyzed by bases. Preferably, however, polyether polyols are used which have been obtained by a reaction of this kind with acid catalysis, using boron trifluoride, for example. It is characteristic of such polyether polyols that, in addition to secondary hydroxyl groups, they contain a considerable amount of primary hydroxyl groups.

One preferred manufacturing process is described, in British Pat. No. 1,016,689. In all of these saccharide-base polyols used according to the invention, it is possible, of course, in the final analysis, to start with starch which can easily be transformed by prior-art methods into the monosaccharides or oligosaccharides.

Also usable as polyols in the meaning of the invention are polyethers of ethylene diamine and/or diethylene triamine-alkylene oxides or polyesters, e.g., those of adipic acid and ethylene glycol, which have terminal hydroxyl groups.

Lastly, polyethers such as can be obtained, for example, by the polyaddition of epoxy compounds and water can also be used according to the invention. Polyethylene oxide, polypropylene oxide, poly-1,2-butylene oxide and polyepichlorhydrin are examples. Polybutylene oxide can also be obtained by the polymerization of tetrahydrofuran.

In the polyols obtained according to British Pat. No. 1,016,589 and other polyether polyols, most acetyl acetonates and chelates are insoluble or insufficiently soluble, while the zirconium-containing catalysts used according to the invention are readily soluble therein.

All of the isocyanates used today in the polyurethane art are usable as the polyisocyanates in this invention. di- and triisocyanates are also preferred, such as aliphatic and aromatic isocyanates having a valence of two and more, e.g. alkylene diisocyanates like tetra- and hexamethylene diisocyanate, arylene diisocyanates and corresponding alkylation products such as m- and p-phenylene diisocyanate, naphthylene diisocyanate, diphenylmethane diisocyanate, toluylene diisocyanates such as 2,4- and 2,6-toluylene diisocyanate and their mixtures, di- and triisopropylbenzene diisocyanate and triphenylmethane triiso-cyanate, p-isocyanatophenylthiophosphoric acid triester, p-isocyanatophenylphosphoric acid triester, aralkyl-diisocyanates such as 1-(isocyanatophenyl)-ethylisocyanate or m-and p-xylylenediisocyanate, as well as polyisocyanates of the types enumerated above which are substituted by various groups, such as alkyoxy-, aryloxy-, $NO_2$ and Cl. Also, polyphenylpolymethylenepoly-isocyanate obtained by the condensation of aniline and formaldehyde followed by phosgenation; and the products of the reaction of the above-mentioned isocyanates with an insufficiency of polyhydroxyl compounds, such as, for example, trimethylolpropane, hexanetriol, glycerin and butanediol. Polyisocyanates masked by phenols or bisulfite, and polymerized isocyanates having an isoryanurate ring structure can also be used.

PROCESSING CONSIDERATIONS

Preferably, the process is performed according to the invention such that only the polyhydroxyl compounds are reacted with the isocyanates, the ratio of quantities being such that there are approximately 0.4 to 2.0 isocyanate groups for each hydroxyl group. Preferably, there should be approximately one isocyanate group for each hydroxyl group.

If the polyol has a moisture content greater than 0.08 weight percent, it has to be dehydrated to prevent a reaction of the isocyanate groups with the water. A dehydrating agent, such as zeolite, has often been used for this purpose. Now, it has been found that the zirconium compounds used according to the invention are also capable of removing the water from the polyol. For this purpose the polyol that is to be used for the process of the invention is mixed with the amount of the zirconium compound that is equivalent to the water contained in the polyol and left standing for a period of time at room temperature.

The isocyanate is then stirred in and the reaction mixture thus produced is poured into a mold where the addition polymerization is completed. Generally the casting can be stripped from the mold after a brief period. With this procedure a stable material is obtained without bubbles or foam.

Basically, cross-linking agents of the prior art can also be used, such as glycol, butanediol, ethylenediamine, 1,3-diaminopropane, 4,4'-diaminodiphenylemethane and hydrazine. In that case either the "one-shot" process or the "-preopolymer" process of the prior art is employed. In this procedure it is often necessary to modify the quantity ratios of the reactants, but it is easy to determine these ratios by preliminary experiments. Generally speaking, an excess of the isocyanate and an insufficiency of the cross linking agent will be used, with respect to the polyol.

THE NEW CATALYST

The catalyst used according to this invention are zirconium alcoholates or phenolates, zirconyl alcoholates or phenolates which contain tetravalent zirconium, and the corresponding zirconium compounds in which the oxygen atoms attached to the zirconium atom are wholly or partially replaced by sulfur atoms. These zirconium compounds are derived from primary, secondary or tertiary aliphatic alcohols or trialcohols with up to five carbon atoms, which can contain oxygen or sulfur bridges in the aliphatic hydrocarbon moieties. Also suitable are zirconium compounds which derive from cycloaliphatic alcohols or from arylalkyl alcohols, and the analogous thioalcohols. Furthermore, those zirconium compounds are also usable according to this invention as catalysts, which derive from phenols or thiophenols containing, if desired, alkyl groups on the aromatic ring, or from a number of different compounds, e.g., from aliphatic and aromatic compounds, containing hydroxyl groups.

Lastly, the condensation products of the above-enumerated zirconium compounds, such as are formed by the loss of alcohol or thioalcohol, or phenol or thiophenol as the case may be, can be used as catalysts. Preference is given to the use of those condensation products which correspond to the general formula $$Zr(YR)_3-(Y-Zr(YR)_2)_n Y Zr(YR)_3,$$

wherein Y and R have the meaning stated previously, and wherein $n$ is a number between 0.2 and 10.

In detail, the following substances, among others, are suitable: zirconium tetra-n-propylate, zirconium tetraisobutylate, zirconium tetracyclopentylate, zirconium tetraethylglycolate, zirconium tetra-n-thiopropylate, zirconium tetraphenolate, zirconium tetrathiophenolate, zirconyl diethylate, zirconyl dithiopropylate. It is an essential requirement the catalysts be soluble in the reaction mixture. The use of zirconium acetylacetonate or, generally, of chelates of zirconium does not come within the scope of this invention.

ADVANTAGES

An advantage of this type of catalyst is that the polyaddition takes place completely so that polyurethanes are obtained which are characterized by outstanding mechanical and electrical properties. The mechanical properties are especially apparent in the preparation of glass fiber reinforced polyurethanes, where the winding process is used, and in the use of polyurethanes as binding agents for porphyry corundum in the making of wear-resistant surfaces in road construction. In the latter case, the rapid setting action is of great importance.

If the process according to the invention is used in casting, it has been found that the dissipation of the heat of reaction is very good, even in thick-walled castings. Materials are obtained which are homogeneous and free of streaks. This also contributes towards good mechanical characteristics, such as high breaking strength and tensile strength. Particularly outstanding is the modulus of elasticity and the impact toughness.

With regard to the desirable dehydration effect which the zirconium compounds have on the starting substances, particularly the polyols, as described above, it is also to be stressed that a smaller amount of the zirconium compound needs to be used than in the case of other dehydrating agents, such as zeolite, in order to achieve the same effect. There is virtually no encumbering of the reaction mixture by often undesirable powered solids. Re-cleavage of the water at high temperature as in the case of zeolite is impossible.

In the manufacture of sheet materials or films by the present process another advantage is obtained. Polyurethane-base sheet materials usually have an irregular and bubbly surface. This is not always to be attributed to moisture in the starting products for the polyurethane, but often is also due to the humidity of the ambient air. The water reacts with isocyanate groups in the surface layers of the reaction mixture, and this undesired reaction is commonly known to result in the evolution of $CO_2$ and the formation of bubbles. In the process of the invention, the presence of the zirconium compounds leads to an acceleration of the reaction between the isocyanate and the polyhydroxyl compound as well as cross-linking agent, if any, to such an extent that the atmospheric moisture cannot compete. Bubble formation is prevented since the zirconium compounds eliminate even the last traces of water from the reaction compositions. Surprisingly, the sheets and films have a uniform, smooth surface. It is also to be noted that the stickiness of the surface vanishes in a very short time.

EXAMPLES

EXAMPLE 1

The polyol in the experiments was a liquid product based on glucose and propylene oxide such as can be prepared by acid catalysis according to Example 2 of British Pat. No. 1,016,589. It had an OH number of 269 and contained about 0.2 weight percent water. 181.5 g of this homogeneous, liquid product was placed in a sealed vessel, 4.5 g of zirconium tetra-n-propylate was added to bind the water, and the mixture was let stand overnight. On the next day, under intense agitation, 118.6 g of a liquid, solvent-free polyisocyanate mixture containing diphenylmethane-4,4'-diisocyanate as the principal component with an effective content of 92 mole-percent, was poured into the vessel. The addition polymerization started immediately, with the evolution of heat. The mixture was immediately poured into test-specimen molds, 10 × 15 × 120 mm. The compound had hardened by 12 minutes after the addition of the isocyanate. The test specimens were stripped out 60 minutes after casting and heated in a drying oven for 3 hours at 110° C.

The cast polyurethane resin prepared in this manner was completely free of bubbles. On the following day the bending test per DIN 53,452 and the impact bending test per DIN 53,453 were performed. The following values were obtained (average of 5 individual measurements): Bending strength 900 kg/cm²; Modulus of Elasticity (from bending test on the basis of Hook's Law): 26,500 kg/cm²; impact toughness: 20.8 kp cm/cm².

COMPARATIVE TEST

In a second batch, dibutyl tin dilaurate was used as the catalyst instead of zirconium tetra-n-propylate. Also, the polyol was dehydrated by means of zeolite.

In detail, the following procedure was used. 240 g of the polyol mentioned above was placed in a half-liter stirrer vessel and 24 g of a dispersion of 50 percent zeolite by weight in castor oil was added. Then the mixture was heated with stirring to 100° C., and at the same time the pressure in the reactor was lowered to about 10 mm Hg. These reaction conditions were sustained for 3 hours. Then the mixture was cooled to 25° C., and the pressure was then raised to normal. 181.5 g of the polyol thus dehydrated was placed in the reaction vessel and 0.2 g of dibutyl tin dilaurate was added. Otherwise, the operations were the same as described above. In this second batch the setting time was again approximately 12 minutes. The cast test specimens were tested according to the same DIN standards.

The results were as follows: bending strength: 730 kg/cm²; modulus of elasticity: 24,760 kg/cm²; impact toughness: 19.9 kp cm/cm².

EXAMPLES 2 to 8

In the following experiments, the polyol was also a liquid product derived from glucose-propylene oxide such as can be prepared by acid catalysis according to British Patent No. 1,016,589. It had a hydroxy number of 314. In each case the polyol was dehydrated with zeolite by procedures similar to the one described in connection with the comparative experiment in Example 1. Further processing to the polyurethane was performed by the procedure outlined in Example 1, except that, instead of zirconium tetra-n-propylate, different catalysts were used in different quantities. The last experiment was performed without the use of a catalyst.

The table lists the setting times and temperatures in relation to the amount of catalyst used. From these figures it is apparent that the zirconium compounds according to the invention do accelerate the addition polymerization.

TABLE

| Ex. | Catalyst Type | Quant. as % of wt. of the polyol | Setting time min. | Setting temp. °C |
|---|---|---|---|---|
| 2 | Zirconium-n-propylate | 0.35 | 10 | 87 |
| 3 | Zirconium-n-propylate | 0.14 | 28 | 70 |
| 4 | Zirconium-n-propylate | 0.08 | 60 | 44 |
| 5 | Zirconium-n-butylate | 0.35 | 16 | 66 |
| 6 | Zirconium-n-butylate | 0.14 | 61 | 41 |
| 7 | Zirconium isobutylate | 0.35 | 60 | — |
| 8 | No catalyst | — | 137 | 30 |

We claim:

1. In the manufacture of a polyurethane by the reaction of a substantially anhydrous polyol with a polyisocyanate in the presence of a catalyst, the improvement comprising using as said catalyst an organic zirconium compound soluble in the reaction mixture and having the formula $$(Y)_m Zr(YR)_{4-2m} \text{ or}$$
$$Zr(YR)_3-[Y-Zr(YR)_2]_n-Y-Zr(YR)_3$$

wherein:
Zr is a zirconium atom,
Y is an oxygen or sulfur atom,
R is an organic radical having up to 12 carbon atoms and is selected from the group consisting of cycloalkyl, arylalkyl, alkylaryl, aryl or alkyl, the alkyl radicals of which can be branched or contain oxygen or sulfur atoms, in the chain,
$m$ is 0 or 1, and
$n$ is 0.2 to 10.

2. The process of claim 1 wherein said polyol is a poly-ether polyol having a functionality in relation to isocyanate groups of 2 to 9 and a hydroxyl number of 30 to 600 and said catalyst is present in an amount in the range of 0.01 to 5 weight percent, based on said polyol.

3. The process of claim 1 wherein said catalyst has the formula:

$$Zr(YR)_3-[Y-Zr(YR)_2]_n-Y-Zr(YR)_3.$$

4. The process of claim 1 wherein R is an alkyl group having in the range of one to five carbon atoms.

5. The process of claim 4 wherein said catalyst is selected from the group consisting of zirconium tetra-n-propylate, zirconium-n-butylate, and zirconium tetra isobutylate.

6. The process of claim 1 wherein at least a portion of said catalyst is admixed with said polyol prior to the addition of said polyisocyanate, to assure the dehydration of said polyol.

7. The process of claim 6 wherein said polyol has an initial water content greater than 0.08 weight percent and said catalyst is admixed therewith and the mixture allowed to stand for some time at room temperature.

* * * * *